United States Patent
Girard et al.

(10) Patent No.: US 11,585,269 B1
(45) Date of Patent: Feb. 21, 2023

(54) APPARATUS FOR REMOVING PARTICULATE MATTER FROM BLEED GAS

(71) Applicant: Pratt & Whitney Canada Corp., Longueuil (CA)

(72) Inventors: Julien Girard, Sainte-Julie (CA); Sylvain Lamarre, Boucherville (CA); Xiaoliu Liu, Mississauga (CA); David Koo, Toronto (CA); Kevin Nguyen, Montreal (CA); Liam McPherson, Ottawa (CA); AnnMarie Unnippillil, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/738,384

(22) Filed: May 6, 2022

(51) Int. Cl.
*F02C 6/08* (2006.01)
*F01D 17/10* (2006.01)

(52) U.S. Cl.
CPC ............. *F02C 6/08* (2013.01); *F01D 17/105* (2013.01); *F05D 2260/606* (2013.01); *F05D 2260/607* (2013.01)

(58) Field of Classification Search
CPC .... F02C 6/08; F01D 17/105; F05D 2260/606; F05D 2260/607
See application file for complete search history.

(56) References Cited

U.S. PATENT DOCUMENTS

| | | | |
|---|---|---|---|
| 4,463,552 A | 8/1984 | Monhardt | |
| 5,123,240 A | 6/1992 | Frost | |
| 6,701,715 B2 | 3/2004 | Anderson | |
| 7,931,740 B2 | 4/2011 | Al-Alusi | |
| 10,287,992 B2 * | 5/2019 | Tan | F01D 25/32 |
| 10,512,876 B2 | 12/2019 | Mercier | |

* cited by examiner

*Primary Examiner* — Jacob M Amick
*Assistant Examiner* — Charles J Brauch
(74) *Attorney, Agent, or Firm* — Getz Balich LLC (57) ABSTRACT

An intake device for a gas turbine engine includes a snorkel and a housing. The snorkel includes a tubular body and an inlet aperture. The tubular body extends between a closed end and an open end opposite the closed end. The inlet aperture is formed through the tubular body proximate the closed end. The housing is mounted to the snorkel. The housing includes an inner wall, an outer wall, a side wall, a settling chamber, and an outlet tube. The inner wall is adjacent the snorkel. The outer wall is opposite the inner wall. The side wall extends from the inner wall to the outer wall. The settling chamber is within the side wall between the inner wall and the outer wall. The settling chamber is fluidly coupled with the open end. The outlet tube extends through the housing from the settling chamber to an exterior of the housing.

20 Claims, 5 Drawing Sheets

APPARATUS FOR REMOVING PARTICULATE MATTER FROM BLEED GAS

TECHNICAL FIELD

This disclosure relates generally to bleed air systems for gas turbine engines and, more particularly, to systems and methods for removing particulate matter from bleed gas.

BACKGROUND OF THE ART

Gas turbine engines, such as those used for aircraft propulsion, may use pressurized bleed gas (e.g., bleed air from a compressor) for operation of one or more systems of the gas turbine engine. Depending on the source of the bleed gas, some amount of contaminants may be present and may be entrained with or otherwise carried by the bleed gas. Some pneumatic system components which use the bleed gas may be particularly sensitive to the presence of contaminants, such as particulate matter, within the bleed gas. Various systems and methods are known in the art for reducing the impact of particulate matter on pneumatic system components. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an intake device for a gas turbine engine includes a snorkel and a housing. The snorkel includes a tubular body and an inlet aperture. The tubular body extends between a closed end and an open end opposite the closed end. The inlet aperture is formed through the tubular body proximate the closed end. The housing is mounted to the snorkel. The housing includes an inner wall, an outer wall, a side wall, a settling chamber, and an outlet tube. The inner wall is adjacent the snorkel. The outer wall is opposite the inner wall. The side wall extends from the inner wall to the outer wall. The settling chamber is within the side wall between the inner wall and the outer wall. The settling chamber is fluidly coupled with the open end. The outlet tube extends through the housing from the settling chamber to an exterior of the housing.

In any of the aspects or embodiments described above and herein, the outlet tube may include an outlet tube passage having a first cross-sectional area. The settling chamber may have a second cross-sectional area. The second cross-sectional area may be at least five times greater than the first cross-sectional area.

In any of the aspects or embodiments described above and herein, the settling chamber may have an inner diameter and a height. The height may be approximately equal to the inner diameter.

In any of the aspects or embodiments described above and herein, the tubular body may include an imperforate portion extending from the inlet aperture to the open end.

In any of the aspects or embodiments described above and herein, the inlet aperture may intersect the closed end of the tubular body.

In any of the aspects or embodiments described above and herein, the inlet aperture may be spaced from the closed end of the tubular body.

According to another aspect of the present disclosure, a gas turbine engine includes a compressor section, a cavity, an engine case, and an intake device. The compressor section forms a portion of a core flow path through the gas turbine engine. The cavity is disposed downstream of the compressor section along the core flow path. The engine case surrounds the cavity. The intake device is mounted to the engine case. The intake device is in fluid communication with the cavity. The intake device is configured to receive pressurized bleed gas from the cavity. The intake device includes a snorkel and a housing. The snorkel includes a tubular body and an inlet aperture. The tubular body extends between a closed end and an open end opposite the closed end. The open end is positioned within the cavity. The inlet aperture is formed through the tubular body adjacent the closed end. The housing is mounted to the snorkel. The housing includes an inner wall, an outer wall, a side wall, a settling chamber, and an outlet tube, the inner wall adjacent the snorkel, the outer wall opposite the inner wall, the side wall extending from the inner wall to the outer wall, the settling chamber fluidly coupled to the snorkel and formed within the side wall between the inner wall and the outer wall, and the outlet tube extending through the housing from the settling chamber to an exterior of the housing.

In any of the aspects or embodiments described above and herein, the gas turbine engine may further include a bleed-off valve in fluid communication with the intake device, the bleed-off valve configured to receive pressurized bleed gas from the intake device.

In any of the aspects or embodiments described above and herein, the bleed-off valve may be in fluid communication with the core flow path within the compressor section via a pressure relief line.

In any of the aspects or embodiments described above and herein, the gas turbine engine may further include a pneumatic actuator in fluid communication between the intake device and the bleed-off valve. The pneumatic actuator may be configured to operate the bleed-off valve between a closed position and an open position in response to pressurized bleed gas supplied to the pneumatic actuator from the intake device.

In any of the aspects or embodiments described above and herein, the gas turbine engine may further include an orifice pack in fluid communication between the intake device and the pneumatic actuator.

In any of the aspects or embodiments described above and herein, the inlet aperture may face a circumferential direction relative to the axial centerline.

In any of the aspects or embodiments described above and herein, the compressor section may be configured to impart a swirl component on pressurized bleed gas flowing within the cavity. The swirl component may have a swirl direction about the axial centerline of the gas turbine engine. The inlet aperture may be located facing away from the swirl direction.

In any of the aspects or embodiments described above and herein, the intake device may include a mistake-proofing feature.

In any of the aspects or embodiments described above and herein, the inlet aperture may be spaced radially inward of the engine case with respect to the axial centerline.

In any of the aspects or embodiments described above and herein, the outlet tube may include an outlet tube passage having a first cross-sectional area. The settling chamber may have a second cross-sectional area. The second cross-sectional area may be at least five times greater than the first cross-sectional area.

In any of the aspects or embodiments described above and herein, the settling chamber may have an inner diameter and a height. The height may be approximately equal to the inner diameter.

In any of the aspects or embodiments described above and herein, the tubular body may include an imperforate portion extending from the inlet aperture to the open end.

According to another aspect of the present disclosure, a gas turbine engine includes a compressor section, a cavity, an engine case, and an intake device. The compressor section is disposed about an axial centerline of the gas turbine engine. The compressor section forms a portion of a core flow path through the gas turbine engine. The cavity is disposed downstream of the compressor section with respect to the core flow path. The engine case is disposed about the axial centerline. The engine case surrounds the cavity. The intake device is mounted to the engine case. The intake device is in fluid communication with the cavity. The intake device includes a housing including an inner wall, an outer wall opposite the inner wall, and a side wall extending from the inner wall to the outer wall. The housing defines a settling chamber within the inner wall, the outer wall, and the side wall. The settling chamber is in fluid communication with the cavity. The settling chamber is configured to receive a bleed gas flow from the cavity. The housing further includes an outlet tube which extends through the housing from the settling chamber to an exterior of the housing. The outlet tube includes an outlet tube passage having a first cross-sectional area. The settling chamber has a second cross-sectional area. The second cross-sectional area is at least five times greater than the first cross-sectional area.

In any of the aspects or embodiments described above and herein, the settling chamber may have an inner diameter and a height. The height may be approximately equal to the inner diameter.

The present disclosure, and all its aspects, embodiments and advantages associated therewith will become more readily apparent in view of the detailed description provided below, including the accompanying drawings.

DETAILED DESCRIPTION

Figure 1:
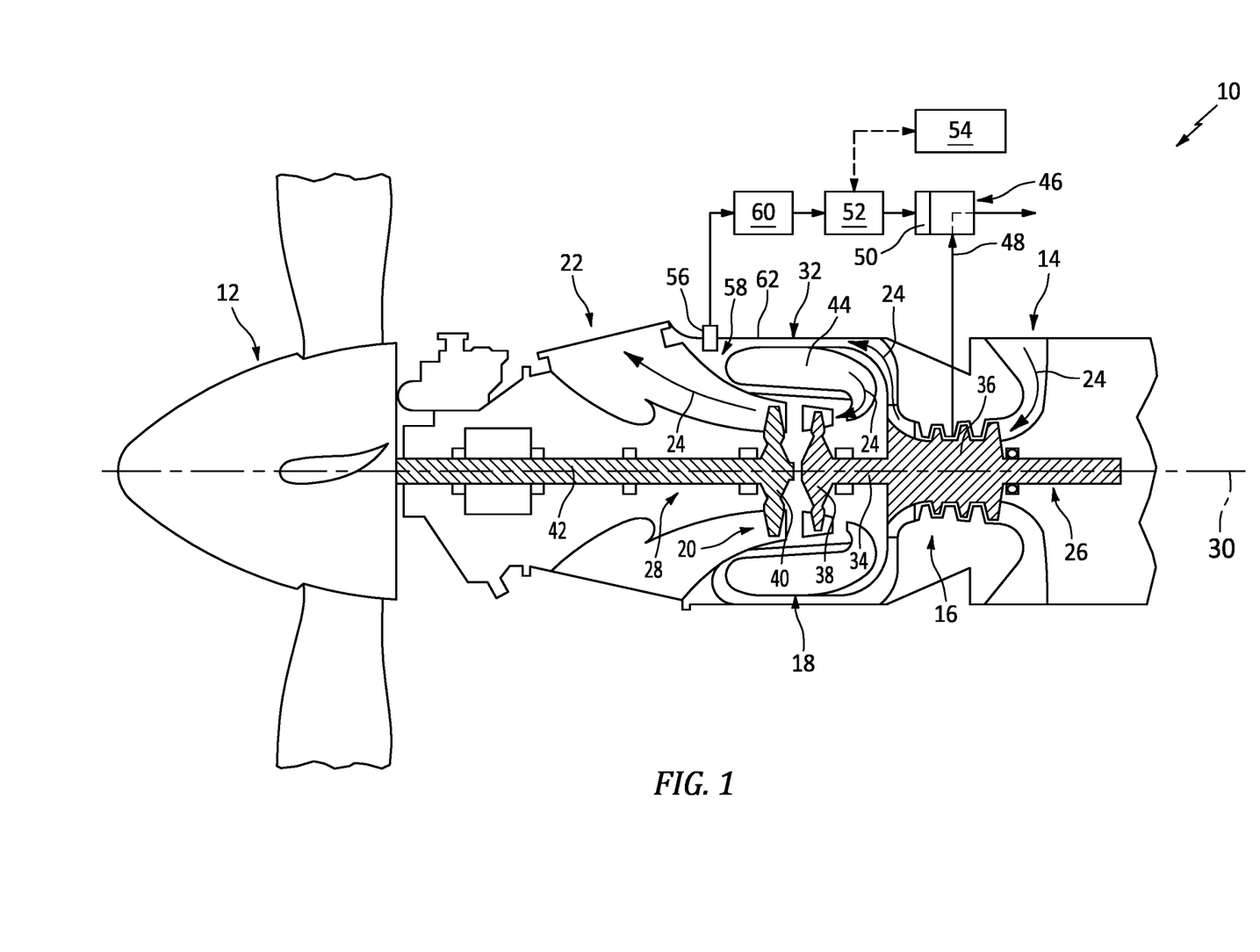
FIG. 1 illustrates a schematic view of a gas turbine engine, in accordance with one or more embodiments of the present disclosure.

FIG. 1 schematically illustrates a gas turbine engine 10. The gas turbine engine 10 of FIG. 1 is a multi-spool turboprop engine. However, while the following description and accompanying drawings refer to a turboprop engine as an example, it should be understood that aspects of the present disclosure may be equally applicable to other types of gas turbine engines including, but not limited to, a turboshaft gas turbine engine, a turbofan gas turbine engine, or a turbojet gas turbine engine. The gas turbine engine 10 of FIG. 1 is configured to drive (e.g., apply a rotational force to) a propeller 12. This gas turbine engine 10 includes an air inlet 14, a compressor section 16, a combustor section 18, a turbine section 20, and an exhaust outlet 22. The compressor section 16 drives air from the air inlet 14 along a core flow path 24 for compression and communication into the combustor section 18 and then expansion through the turbine section 20.

The gas turbine engine 10 of FIG. 1 includes a first rotational assembly 26 (e.g., a high-pressure spool), a second rotational assembly 28 (e.g., a low-pressure spool), an engine static structure 32 (e.g., an engine case), and an annular combustor 44. The first rotational assembly 26 and the second rotational assembly 28 are mounted for rotation about an axial centerline 30 (e.g., a rotational axis) of the gas turbine engine 10 relative to the engine static structure 32. The first rotational assembly 26 includes a first shaft 34, a first compressor 36, and a first turbine 38. The first shaft 34 interconnects the first compressor 36 and the first turbine 38. The second rotational assembly 28 includes a second turbine 40 a second shaft 42 and. The second turbine 40 is connected to the second shaft 42. It should be understood that "low pressure" and "high pressure" or variations thereof as used herein are relative terms indicating that the high pressure is greater than the low pressure. The annular combustor 44 is disposed between the first compressor 36 and the first turbine 38 along the core flow path 24. In operation, airflow along the core flow path 24 is compressed by the first compressor 36, mixed and burned with fuel in the combustor 44, and then expanded through the first turbine 38 and the second turbine 40. The first turbine 38 and the second turbine 40 rotationally drive the first rotational assembly 26 and the second rotational assembly 28, respectively, in response to the expansion of the combustion gas. The combustion gas may then exit the gas turbine engine 10 via the exhaust outlet 22.

The first rotational assembly 26 and the second rotational assembly 28 of FIG. 1 are mechanically independent of one another so that they may rotate at different speeds and/or in opposite directions. The air flow through the gas turbine engine 10 of FIG. 1 along the core flow path 24 is directed in an aft-to-forward direction, where the air inlet 14 may be disposed in a portion of the gas turbine engine 10 which is aft of the combustor 44 and the exhaust outlet 22 may be disposed in a portion of the gas turbine engine 10 which is forward of combustor 44. The exemplary configuration of gas turbine engine 10 of FIG. 1 may be referred to as a "reverse-flow free turbine engine." As indicated above, the present disclosure is not limited to this gas turbine engine 10 example and is not limited to gas turbine engines featuring a reverse air flow.

The gas turbine engine 10 of FIG. 1 includes a bleed-off valve 46 (BOV), a pilot valve 52, an orifice pack 60, and an intake device 56. As will be discussed in further detail, the intake device 56 is in fluid communication with a pressurized gas cavity 58 of the gas turbine engine 10. The intake device 56 may be fluidly coupled to the orifice pack 60. The orifice pack 60 may be fluidly coupled to the pilot valve 52. The pilot valve 52 may be fluidly coupled to the bleed-off valve 46 (e.g., a pneumatic actuator of the bleed-off valve 46). In other words, the intake device 56 may be connected to the orifice pack 60, the orifice pack 60 may be connected to the pilot valve 52, and the pilot valve 52 may be connected to the bleed-off valve 46 using one or more conduits, pipes, tubes, cases, apertures, and the like, so that a fluid (e.g., a pressurized gas) is conveyed from a first component (e.g., the intake device 56) to a second component (e.g., the orifice pack 60).

The bleed-off valve 46 is in fluid communication with the core flow path 24 within the compressor section 16. For example, the bleed-off valve 46 of FIG. 1 is fluidly coupled with an intermediate stage of the first compressor 36 by a pressure relief line 48. The bleed-off valve 46 is configured to control (e.g., regulate) core gas flow along the core flow path 24 by selectively releasing core gas from the core flow path 24 to the surrounding atmosphere, based on operating conditions of the gas turbine engine 10. In other words, core gas from an intermediate stage of the first compressor 36 may flow through the pressure relief line 48 and may be released to the surrounding atmosphere by the bleed-off valve 46.

The bleed-off valve 46 may include or otherwise be in operable communication with a pneumatic actuator 50. The pneumatic actuator 50 may be operated by pressurized gas to selectively position the bleed-off valve 46 in a closed position, an open position, and a plurality of intermediate positions between the closed position and the open position, to control the release of the core gas from the core flow path 24. The bleed-off valve 46 may be opened at a relatively low rotational speed of the first rotational assembly 26 (e.g., a relatively low engine power condition) and may be closed at a relatively high rotational speed of the first rotational assembly 26 (e.g., a relatively high engine power condition).

The bleed-off valve 46 may be a piloted valve. The gas turbine engine 10 of FIG. 1, for example, includes the pilot valve 52 fluidly coupled to the pneumatic actuator 50. The pilot valve 52 is configured to control a flow of pressurized gas (e.g., bleed air or bleed gas) to the pneumatic actuator 50 to control the position of the bleed-off valve 46. The pilot valve 52 may be configured as, for example, a solenoid valve. The pilot valve 52 may be controlled using an electrical signal provided by a controller 54. The controller 54 may be configured to determine whether operating conditions of the gas turbine engine 10 satisfy criteria for releasing core gas from the core flow path 24 via the bleed-off valve 46, for example, based on signals from one or more sensors (e.g., pressure sensors, temperature sensors, etc.) disposed within the compressor section 16.

The controller 54 may include any type of computing device, computational circuit, processor(s), CPU, computer, or the like capable of executing a series of instructions that are stored in memory. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The controller 54 may include a single memory device or a plurality of memory devices (e.g., a computer-readable storage device that can be read, written, or otherwise accessed by a general purpose or special purpose computing device), including any processing electronics and/or processing circuitry capable of executing instructions. The present disclosure is not limited to any particular type of memory device, which may be non-transitory, and which may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) maybe directly or indirectly coupled to the controller 54. The controller 54 may include, or may be in communication with, an input device that enables a user to enter data and/or instructions, and may include, or be in communication with, an output device configured, for example to display information (e.g., a visual display or a printer), or to transfer data, etc. Communications between the controller 54 and the pilot valve 52, for example, may be via a hardwire connection or via a wireless connection. A person of skill in the art will recognize that portions of the controller 54 may assume various forms (e.g., digital signal processor, analog device, etc.) capable of performing the functions described herein.

Figure 2:
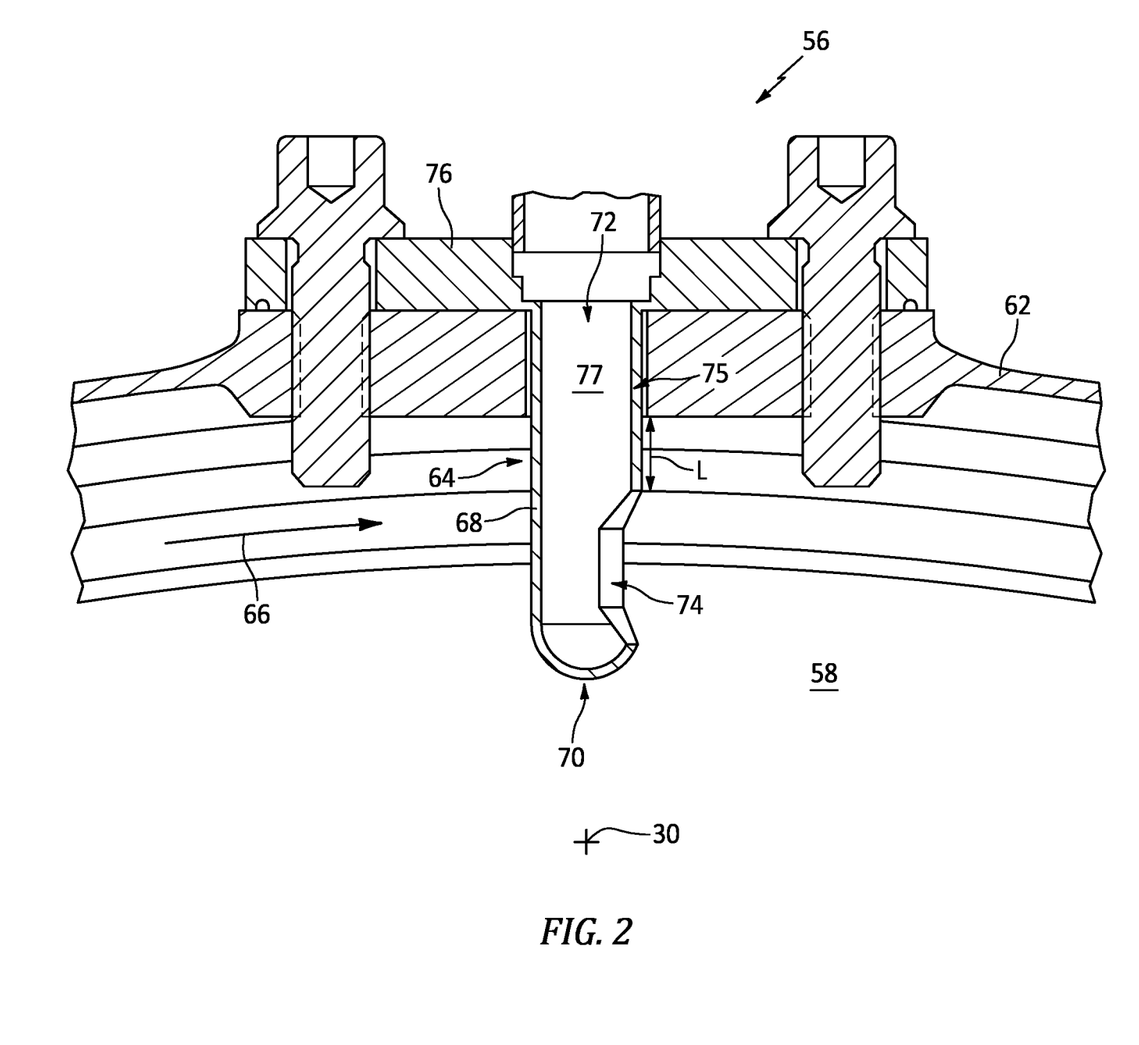
FIG. 2 illustrates a side, cross-sectional view of a portion of an intake device, in accordance with one or more embodiments of the present disclosure.

Referring to FIGS. 1 and 2, pressurized gas used for operation of the bleed-off valve 46 may be sourced from one or more locations within the gas turbine engine 10. The gas turbine engine 10 of FIG. 1, for example, includes a portion of the intake device 56 positioned within the cavity 58. The cavity 58 of FIG. 1 is formed, in part, by an engine case 62, which engine case 62 may form a portion of the engine static structure 32. The engine case 62 surrounds the cavity 58. The intake device 56 extends through the engine case 62 (e.g., a snorkel aperture of the engine case 62) with at least a portion of the intake device 56 positioned in the cavity 58. The cavity 58 of FIG. 1 includes a portion of the core flow path 24 between the first compressor 36 and the combustor 44. However, the intake device 56 of the present disclosure is not limited to use with the particular cavity 58 of FIG. 1 or with the core flow path 24.

Pressurized gas received by the intake device 56 may be supplied to the pneumatic actuator 50 for operation of the bleed-off valve 46. The cavity 58 of FIG. 1 may be located downstream of a highest-pressure compressor stage of the compressor section 16 along the core flow path 24. The pressurized gas from the cavity 58 may provide relatively high-pressure gas suitable for effecting operation of the bleed-off valve 46. Pressurized gas received by the intake device 56 may be conveyed to the pneumatic actuator 50 through the orifice pack 60. The orifice pack 60 may control (e.g., regulate) a pressure of the pressurized gas supplied to the bleed-off valve 46 by the intake device 56. The present disclosure is not limited to locating an intake device 56 in a highest-pressure compressor stage of the compressor section 16.

Gas within annular gas turbine engine cavities located within or downstream of a compressor section, such as the cavity 58, may exhibit a high degree of swirl. The gas flowing downstream from the first compressor 36, for example, may have a relatively high circumferential flow component, which causes the gas to swirl circumferentially about the axial centerline 30 as the gas flows downstream towards the combustor 44. Significant swirl velocity may be imparted on the gas by upstream rotating components such as those of the compressor section 16. The relatively high velocity of the swirling gas may allow the gas to carry particulate matter such as dust, dirt, sand, debris, etc. For example, gas received by the intake device 56 for operation of the bleed-off valve 46 may include particulate matter entrained with the gas. The particulate matter may have a size within a range of approximately 50 to 200 microns;

however, particulate matter size may vary. Particulate matter ingested by the intake device 56 with the pressurized gas may be conveyed to downstream components such as the orifice pack 60, the pilot valve 52, and the pneumatic actuator 50. In particular, the bleed-off valve 46 and/or the pneumatic actuator 50 for the bleed-off valve 46 may exhibit some sensitivity to particulate matter exposure. For example, excessive build-up of particulate matter within the pneumatic actuator 50 can lead to improper operation of the bleed-off valve 46.

At least some conventional bleed air systems may include filters which may be used to remove particulate matter from bleed air. However, filters have limited contaminant accumulating capabilities and may require replacement after a predetermined period of operational time or contaminant accumulation. Periodic filter replacement can lead to gas turbine engine downtime and substantial maintenance costs. Moreover, in harsh environments, such as those which include relatively high levels of airborne dust, sand, and other debris, conventional filters can quickly become clogged, thereby leading to improper operation of bleed air loads.

Referring to FIGS. 1-5, the present disclosure intake device 56 may eliminate or substantially reduce the quantity of particulate matter to which downstream components, such as the bleed-off valve 46, are exposed. While the present disclosure intake device 56 is describe with respect to the operation of the bleed-off valve 46 of FIG. 1, it should be understood that aspects of the present disclosure intake device 56 are relevant to other bleed air systems including components which may be sensitive to particulate matter entrained in the bleed air. With respect to the intake device 56, the terms "upstream" and "downstream," as used herein, refer to the direction of bleed gas flow through the intake device 56 in a direction from the cavity 58 to the bleed-off valve 46.

Figure 5:
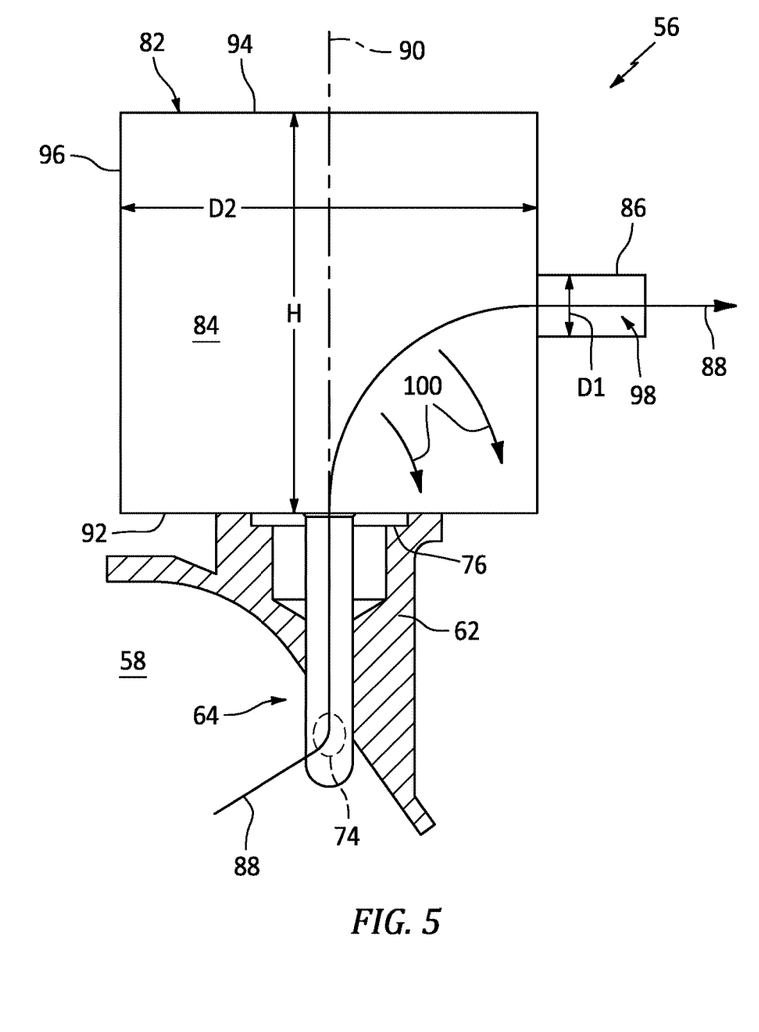
FIG. 5 illustrates a side, cross-sectional view of an intake device, in accordance with one or more embodiments of the present disclosure.

The intake device 56 of FIGS. 1, 2, and 5 is mounted to an engine case 62 disposed about the axial centerline 30 and surrounding the cavity 58. While the intake device 56 is shown mounted to the engine case 62, in alternative embodiments, the intake device 56 may be mounted on an engine case, engine frame, or other structural panel which defines at least a portion of a gas flow path. The intake device 56 may include a snorkel 64. FIG. 2 illustrates a cross-sectional view of a portion of the intake device 56 with the snorkel 64 positioned within the cavity 58. FIG. 2 additionally illustrates an exemplary flow direction 66 representing the circumferential flow component of the swirling gas within the cavity 58. The snorkel 64 includes a tubular body 68, a base 76, an inlet aperture 74, and a gas passage 77. The tubular body 68 extends from the open end 72 to the closed end 70. The open end 72 is coincident with the base 76. The closed end 70 forms a distal end of the tubular body 68. The closed end 70 may be an imperforate portion of the tubular body 68. The tubular body 68 surrounds the gas passage 77. The gas passage 77 extends from the closed end 70 through the open end 72. The inlet aperture 74 is formed through the tubular body 68 between the gas passage 77 and an exterior of the tubular body 68. The inlet aperture 74 may be positioned at, adjacent, and/or proximate the closed end 70 of the tubular body 68. In some embodiments, the tubular body 68 may include an imperforate portion 75 between the inlet aperture 74 and the open end 72. In other words, the tubular body 68 may not be perforated in the imperforate portion 75 extending from the inlet aperture 74 to the open end 72 of the tubular body 68. In some embodiments, the tubular body 68 may be imperforate with the exception of only the inlet aperture 74 and the open end 72. The base 76 may extend outward from the tubular body 68. The base 76 may surround the tubular body 68 at or proximate the open end 72 of the tubular body 68. In some embodiments, the base 76 may be fixedly mounted to the engine case 62, for example, using one or more fasteners.

The tubular body 68 extends inward (e.g., radially inward) from the engine case 62. The tubular body 68 has a length L between the engine case 62 and the inlet aperture 74 of the snorkel 64. A greater concentration of particulate matter may be entrained within the gas flowing along the flow direction 66 in the immediate vicinity of the engine case 62. The length L may correspond to a gas flow region having a higher concentration of particulate matter. The location of the inlet aperture 74, with respect to the engine case 62, may correspond to a gas flow region having a relatively lower concentration of particulate matter. Thus, the position of the inlet aperture 74, spaced (e.g., radially spaced) from the engine case 62 may reduce the amount of particulate matter entrained with gas ingested by the intake device 56.

In some embodiments, the intake device 56 may be installed with the inlet aperture 74 of the snorkel 64 having a predetermined position and orientation relative to the flow direction 66 of gas within the cavity 58. As shown in FIG. 2, the inlet aperture 74 may be located in a portion of the tubular body 68 which faces away from the flow direction 66 of the gas within the cavity 58. For example, the inlet aperture 74 may face in a circumferential direction. Accordingly, the tubular body 68 may shield the inlet aperture 74 from direct impingement of particulate matter entrained with the gas, thereby further reducing the amount of particulate matter entrained with the gas ingested by the intake device 56.

Figure 3A:
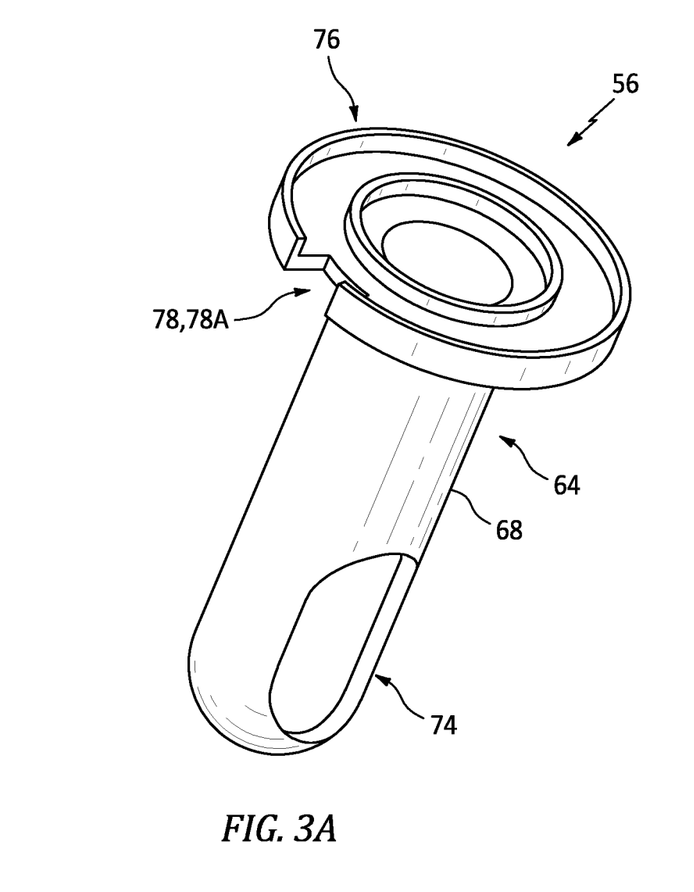
FIG. 3A-B illustrate perspective views of portions of an intake device, in accordance with one or more embodiments of the present disclosure.
Figure 3B:
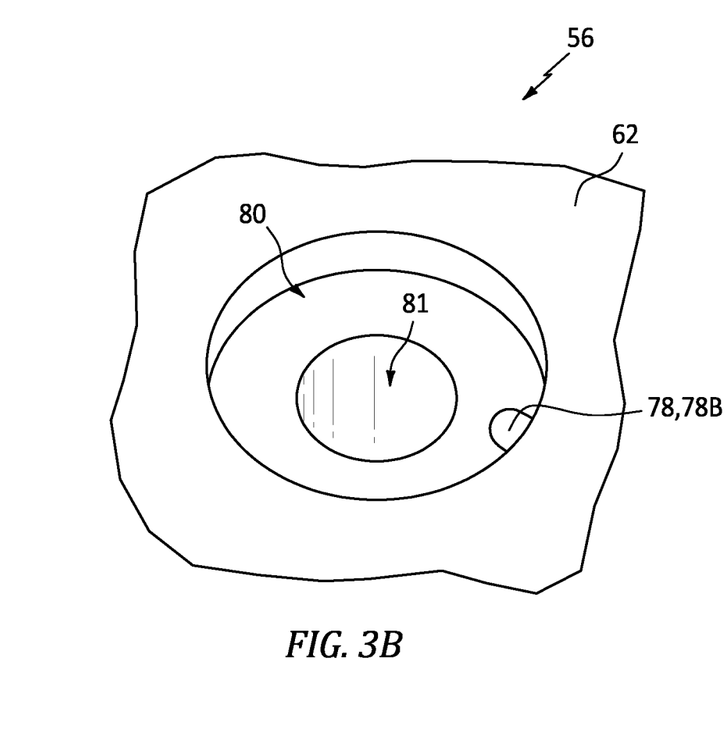

In some embodiments, the intake device 56 may include a mistake-proofing feature 78 configured to ensure that the intake device 56 is installed with the correct predetermined position and orientation of the inlet aperture 74 of the snorkel 64. FIG. 3A illustrates a perspective view of the snorkel 64 in which the base 76 includes a first portion 78A of the mistake-proofing feature 78. The first portion 78A of FIG. 3A includes an indentation formed in a circumferential perimeter of the base 76. FIG. 3B illustrates a perspective view of a portion of the engine case 62. The engine case 62 of FIG. 3B includes a recess 80 surrounding a snorkel aperture 81. The base 76 may be positioned within the recess 80 such that the tubular body 68 extends through the snorkel aperture 81 of the engine case 62. The engine case 62 may further include a second portion 78B of the mistake-proofing feature 78. The second portion 78B of FIG. 3B includes a protrusion (e.g., a pin) positioned within the recess 80. Positioning the base 76 in the recess 80 such that the first portion 78A engages the second portion 78B may facilitate installation of the snorkel 64 with the correct predetermined position and orientation relative to the engine case 62.

Figure 4A:
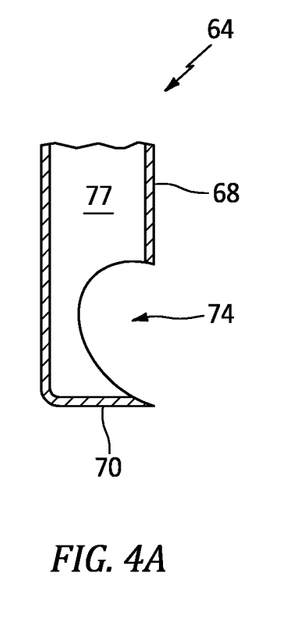
FIGS. 4A-B illustrate side, cross-sectional views of portions of an intake device, in accordance with one or more embodiments of the present disclosure.
Figure 4B:
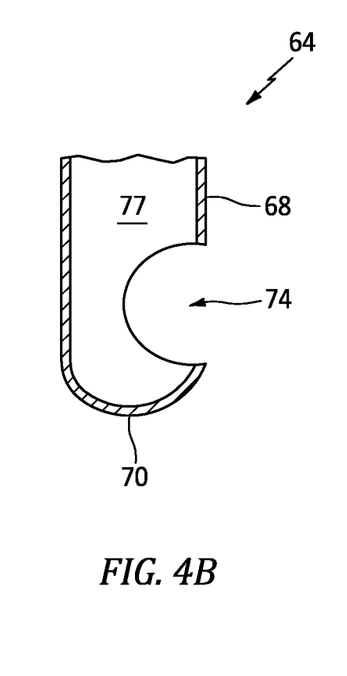

The tubular body 68 and inlet aperture 74 may be configured with a variety of orientations and shapes. FIGS. 4A and 4B illustrate sectional views of a portion of the tubular body 68 including the inlet aperture 74. The closed end 70 of FIG. 4A is substantially flat (e.g., planar). The inlet aperture 74 of FIG. 4A intersects or substantially intersects the closed end 70. The inlet aperture 74 of FIG. 4B is spaced (e.g., radially spaced) from the closed end 70. The closed end 70 of FIG. 4B has a rounded (e.g., hemispherical) shape. The closed end 70 may be rounded to provide a smooth aerodynamic profile. The snorkel 64 of the present disclosure, of course, is not limited to the foregoing exemplary tubular body 68 and/or inlet aperture 74 configurations of FIGS. 4A and 4B.

Referring to FIG. 5, the intake device 56 includes a housing 82 mounted to the snorkel 64. The housing 82 may be mounted to the base 76 of the snorkel 64. The housing 82 surrounds and forms an internal settling chamber 84 disposed downstream of the snorkel 64. The housing 82 includes an inner wall 92 which is adjacent, coincident with, or otherwise includes portions of the base 76 of the snorkel 64. The housing 82 includes an outer wall 94 opposite the inner wall 92. The housing 82 includes a side wall 96 (e.g., a tubular side wall) extending from the inner wall 92 to the outer wall 94. The housing 82 further includes an outlet tube 86 which extends through the housing 82 from the settling chamber 84 to an exterior of the housing 82. The outlet tube 86 includes an outlet tube passage 98. The outlet tube 86 has an inner diameter D1. The inner diameter D1 of the outlet tube 86 may be understood to be oriented substantially perpendicular to a direction of gas flow through the outlet tube 86. The outlet tube passage 98 has a cross-sectional area which may be understood to extend along a plane which is substantially perpendicular to a direction of gas flow through the outlet tube 86. The outlet tube 86 of the settling chamber 84 is in fluid communication with the orifice pack 60 (see FIG. 1). Pressurized gas from the cavity 58 flow through the intake device 56 along a bleed flow path (illustrated schematically in FIG. 4 as bleed flow path 88).

The housing 82 of the intake device 56 of FIG. 5 has a cylindrical shape disposed about a housing center axis 90. The housing 82 of the present disclosure, however, is not limited to any particular shape; e.g., the housing 82 may alternatively be cuboid. The settling chamber 84 of FIG. 4 has an inner diameter D2 which extends between opposing portions (e.g., diametrically opposing portions) of the side wall 96. The inner diameter D2 extends substantially perpendicular to the housing center axis 90. The settling chamber 84 has a height H which extends substantially parallel to the housing center axis 90 from the inner wall 92 to the outer wall 94. The settling chamber 84 has a cross-sectional area which may be understood to extend along a plane which is substantially perpendicular to the housing center axis 90. The inner diameter D2 of the housing 82 may be equal to or greater than approximately five times the inner diameter D1 of the outlet tube 86. The cross-sectional area of the settling chamber 84 may be equal to or greater than approximately five times the cross-sectional area of the outlet tube passage 98. The height H of the settling chamber 84 may be approximately equal to the inner diameter D2 of the housing 82. As used herein, the term "approximately" refers to a range for the stated parameter or value which is +/−ten percent (10%) of the stated parameter or value.

As described above, gas from the cavity 58 may pass through the intake device 56 along the bleed flow path 88. Due to the relatively large cross-sectional area of the settling chamber 84 (e.g., relative to the cross-sectional area of the outlet tube passage 98), gas flowing through the settling chamber 84 may diffuse, thereby reducing the velocity of the gas. The gas flowing along the bleed flow path 88 may have a velocity which is relatively small; e.g., near zero. Due to the near-zero gas velocity within the settling chamber 84, particulate matter (illustrated schematically in FIG. 5 as particulate matter 100) entrained with the gas may separate from the gas flowing along the bleed flow path 88 and, therefore, the particulate matter 100 may fall to the bottom of the settling chamber 84. For example, the particulate matter 100 may accumulate on the inner wall 92 of the housing 82. Gas exiting the settling chamber 84 via the outlet 110, and thereby supplied to the bleed-off valve 46 (see FIG. 1), may be free of or substantially free of particulate matter or otherwise may include a substantially reduced quantity of particulate matter. The intake device 56 may be particularly useful for bleed gas systems which experience relatively low gas flow rates, thereby allowing separation of particulate matter from surrounding gas by settling. However, the present disclosure is not limited to any particular gas flow rates through the intake device 56.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. An intake device for a gas turbine engine, the intake device comprising:
   a snorkel including a tubular body and an inlet aperture, the tubular body extending between a closed end and an open end opposite the closed end, and the inlet aperture formed through the tubular body proximate the closed end; and
   a housing mounted to the snorkel, the housing including an inner wall, an outer wall, a side wall, a settling chamber, and an outlet tube, the inner wall adjacent the snorkel, the outer wall opposite the inner wall, the side wall extending from the inner wall to the outer wall, the settling chamber within the side wall between the inner wall and the outer wall, the settling chamber fluidly coupled with the open end, and the outlet tube extending through the housing from the settling chamber to an exterior of the housing.

2. The intake device of claim 1, wherein:
   the outlet tube includes an outlet tube passage having a first cross-sectional area;
   the settling chamber has a second cross-sectional area; and
   the second cross-sectional area is at least five times greater than the first cross-sectional area.

3. The intake device of claim 1, wherein the settling chamber has an inner diameter and a height, wherein the height is approximately equal to the inner diameter.

4. The intake device of claim 1, the tubular body includes an imperforate portion extending from the inlet aperture to the open end.

5. The intake device of claim 1, wherein the inlet aperture intersects the closed end of the tubular body.

6. The intake device of claim 1, wherein the inlet aperture is spaced from the closed end of the tubular body.

7. A gas turbine engine comprising:
   a compressor section forming a portion of a core flow path through the gas turbine engine;
   a cavity disposed downstream of the compressor section along the core flow path;
   an engine case surrounding the cavity; and
   an intake device mounted to the engine case, the intake device in fluid communication with the cavity, the intake device configured to receive pressurized bleed gas from the cavity, the intake device comprising:
      a snorkel including a tubular body and an inlet aperture, the tubular body extending between a closed end and an open end opposite the closed end, the open end positioned within the cavity, and the inlet aperture formed through the tubular body adjacent the closed end; and
      a housing mounted to the snorkel, the housing including an inner wall, an outer wall, a side wall, a settling chamber, and an outlet tube, the inner wall adjacent the snorkel, the outer wall opposite the inner wall, the side wall extending from the inner wall to the outer wall, the settling chamber fluidly coupled to the snorkel and formed within the side wall between the inner wall and the outer wall, and the outlet tube extending through the housing from the settling chamber to an exterior of the housing.

8. The gas turbine engine of claim 7, further comprising a bleed-off valve in fluid communication with the intake device, the bleed-off valve configured to receive pressurized bleed gas from the intake device.

9. The gas turbine engine of claim 8, wherein the bleed-off valve is in fluid communication with the core flow path within the compressor section via a pressure relief line.

10. The gas turbine engine of claim 8, further comprising a pneumatic actuator in fluid communication between the intake device and the bleed-off valve, the pneumatic actuator configured to operate the bleed-off valve between a closed position and an open position in response to pressurized bleed gas supplied to the pneumatic actuator from the intake device.

11. The gas turbine engine of claim 10, further comprising an orifice pack in fluid communication between the intake device and the pneumatic actuator.

12. The gas turbine engine of claim 7, inlet aperture faces a circumferential direction relative to the axial centerline.

13. The gas turbine engine of claim 12, wherein the compressor section is configured to impart a swirl component on pressurized bleed gas flowing within the cavity, wherein the swirl component has a swirl direction about the axial centerline of the gas turbine engine, and wherein the inlet aperture is located facing away from the swirl direction.

14. The gas turbine engine of claim 7, wherein the intake device includes a mistake-proofing feature.

15. The gas turbine engine of claim 7, wherein the inlet aperture is spaced radially inward of the engine case with respect to the axial centerline.

16. The gas turbine engine of claim 7, wherein the outlet tube includes an outlet tube passage having a first cross-sectional area, the settling chamber has a second cross-sectional area, and the second cross-sectional area is at least five times greater than the first cross-sectional area.

17. The gas turbine engine of claim 7, wherein the settling chamber has an inner diameter and a height, wherein the height is approximately equal to the inner diameter.

18. The gas turbine engine of claim 7, the tubular body includes an imperforate portion extending from the inlet aperture to the open end.

19. A gas turbine engine comprising:
   a compressor section disposed about an axial centerline of the gas turbine engine, the compressor section defining a portion of a core flow path through the gas turbine engine;
   a cavity disposed downstream of the compressor section with respect to the core flow path;
   an engine case disposed about the axial centerline, the engine case surrounding the cavity; and
   an intake device mounted to the engine case, the intake device in fluid communication with the cavity, the intake device comprising a housing including an inner wall, an outer wall opposite the inner wall, and a side wall extending from the inner wall to the outer wall, the housing defining a settling chamber within the inner wall, the outer wall, and the side wall, the settling chamber in fluid communication with the cavity, the settling chamber configured to receive a bleed gas flow from the cavity, the housing further including an outlet tube which extends through the housing from the settling chamber to an exterior of the housing, the outlet tube including an outlet tube passage having a first cross-sectional area, the settling chamber having a second cross-sectional area, and the second cross-sectional area is at least five times greater than the first cross-sectional area.

20. The gas turbine engine of claim 19, wherein the settling chamber has an inner diameter and a height, wherein the height is approximately equal to the inner diameter.

* * * * *